(12) United States Patent
Edmonson et al.

(10) Patent No.: US 7,005,964 B2
(45) Date of Patent: Feb. 28, 2006

(54) DUAL TRACK SURFACE ACOUSTIC WAVE RFID/SENSOR

(75) Inventors: Peter J. Edmonson, Hamilon (CA); Colin K. Campbell, Ancaster (CA)

(73) Assignee: P. J. Edmonson Ltd., Hamilton (CA)

( * ) Notice: Subject to any disclaimer, the term of this patent is extended or adjusted under 35 U.S.C. 154(b) by 74 days.

(21) Appl. No.: 10/400,656

(22) Filed: Mar. 28, 2003

(65) Prior Publication Data

US 2003/0231107 A1 Dec. 18, 2003

Related U.S. Application Data

(60) Provisional application No. 60/370,207, filed on Apr. 8, 2002.

(51) Int. Cl.
*H04Q 5/22* (2006.01)

(52) U.S. Cl. .................. 340/10.1; 310/313 B; 342/51
(58) Field of Classification Search .............. 340/10.1; 310/313 A, 313 B, 313 R, 313 D; 455/121; 342/51, 50, 60, 42, 43; 333/17.3; 235/454, 235/455

See application file for complete search history.

(56) References Cited

U.S. PATENT DOCUMENTS 6,127,768 A * 10/2000 Stoner et al. ............ 310/313 A
6,570,462 B1 * 5/2003 Edmonson et al. ......... 333/17.3
6,621,192 B1 * 9/2003 Lu et al. ................ 310/313 A
6,708,881 B1 * 3/2004 Hartmann .................. 235/454
6,803,698 B1 * 10/2004 Tabota .................... 310/313 R
6,825,794 B1 * 11/2004 Edmonson et al. ........... 342/51

* cited by examiner

*Primary Examiner*—Michael Horabik
*Assistant Examiner*—William Bangachon
(74) *Attorney, Agent, or Firm*—Robert F. Delbridge

(57) ABSTRACT

A SAW RFID tag or sensor has an antenna for receiving and propagating an RF signal, an input/output IDT electrically connected to the antenna, and a dual track reflective IDT having a first track and a second track located adjacent and acoustically coupled to the input/output IDT. An RF signal received from the antenna by the input/output IDT is transformed by the input/output IDT into an acoustic way which is propagated to the dual track IDT. One track of the dual track IDT is in-phase with the phase reference of the input/output IDT and the other track is in quadrature phase with said phase reference. The input/output IDT receives two orthogonal complex modulated acoustic waves reflected from the first and second tracks and transforms them to a modulated orthogonal complex RF signal which is propagated from the antenna.

11 Claims, 6 Drawing Sheets

DUAL TRACK SURFACE ACOUSTIC WAVE RFID/SENSOR

RELATED APPLICATION

This application claims priority from U.S. Provisional Patent Application No. 60/370,207 filed Apr. 8, 2002.

FIELD OF INVENTION

This invention relates to surface acoustic wave radio frequency identification devices or sensors.

BACKGROUND OF INVENTION

Surface acoustic wave (SAW) devices have been regularly used for the passive retrieval of information via a wireless retransmission of interrogative radio frequency (RF) signals. This information could be in the form of a modulated code embossed into the geometry of the device for use as identification device (RFID) tags or information pertaining to a sensor that is attached as a load impedance. These thin film devices require no battery for certain operations as they selectively reflect an interrogating RF pulse back to an interrogating transceiver with the information adapted into the RF signal.

A SAW RFID tag or sensor typically has a suitable antenna attached to the input/output inter-digital transducer (IDT) of the SAW device and receives an RF pulse sent from the interrogation transceiver located either line-of-sight or non-line-of-sight a few metres away. This RF pulse is transformed by the IDT into an acoustic wave and propagates towards other IDTs adjacent to the originating IDT placed on the same piezoelectric substrate. The other adjacent reflective IDT is then configured either as a modulated structure for an RFID application or has a measuring load attached for an application as a sensor.

SAW RFID tags are ideally suited for people or asset tracking. The tags are inconspicuously small, require no battery for certain operations and can be easily read by interrogating circuitry at distances of a few metres in either a line-of-sight or non-line-of-sight path. Generally 32, 64 or even 96 bits are encoded into the geometries of these devices to provide unique identification for up to billions of items. Low cost is one of the major parameters associated with RFID tags, as most of them will be disposable and non-recoverable.

SAW sensors have a wide range of applications which include automotive (torque, proximity radar and tire pressure), medical (biosensors) and industrial (temperature, pressure, humidity mass and vapour) applications.

SUMMARY OF INVENTION

According to the present invention, at least one of the adjacent reflective IDTs is divided into two separate adjacent tracks with the positioning of the IDT geometry such that the reflected signals from these two tracks are offset by 90°. This permits the two reflected signals to be orthogonal or in quadrature with each other. Signals that are in quadrature do not interfere with each other, as they are two independent components of a composite signal.

An advantage of this invention is that each track can therefore have independent information associated with it. The two independent tracks allow for a either a reference or second measuring signal to be orthogonally sent along with the first measuring signal to be independently separated at the interrogating transceiver. The reference signal is used to negate anomalies of a first measuring sensor. A second sensor could be totally independent or be configured as a differential pair, measuring the same parameter, with the first sensor.

For RFID tag applications, a complex 32-bit code can be derived by combining the 16 bits of data from the in-phase track with the orthogonal 16 bits of data from the quadrature-phase track. This would reduce the total length and cost of the device yet improve the read times. For sensor applications, a measuring sensor could be attached as a load to one track and either a second measuring sensor or reference load be attached to the other track. This would assist in tracking anomalies such as temperature drift or wireless propagation related errors. The second sensor could be configured to measure a differential signal with respect to the first sensor.

SAW RFID tags used for people and asset tracking are one of the numerous techniques that this invention will assist. The SAW RFID tag may replace the optical scanning bar code for the identification of items. Two independent tracks sending modulated coded orthogonal complex signals back to the interrogation transceiver simultaneously would improve the total capacity of the system such as having two 16-bit codes in the same IDT length as a single 16-bit code. The speed of the bits arriving back to the interrogation transceiver would be twice as fast as the latter, thereby improving read times for longer codes.

Similarly, SAW sensors for the wireless monitoring of various sensor applications will have the option of either a reference load or a second measuring signal be attached to the second track. These two sensors attached to the same SAW device on different signal orthogonal tracks would greatly reduce the cost of the monitoring project.

Such dual track SAW RFID tags and sensors may be typically used in but not limited to the frequency bands of 400 MHz to >5 GHz depending on the application of harmonic techniques. They are very well suited for the newer Ultra Wide Band (UWB) frequency allocations.

DESCRIPTION OF THE DRAWINGS

Embodiments of the invention will now be described, by way of example, with reference to the accompanying drawings, of which.

DESCRIPTION OF THE PREFERRED EMBODIMENTS

Figure 1:
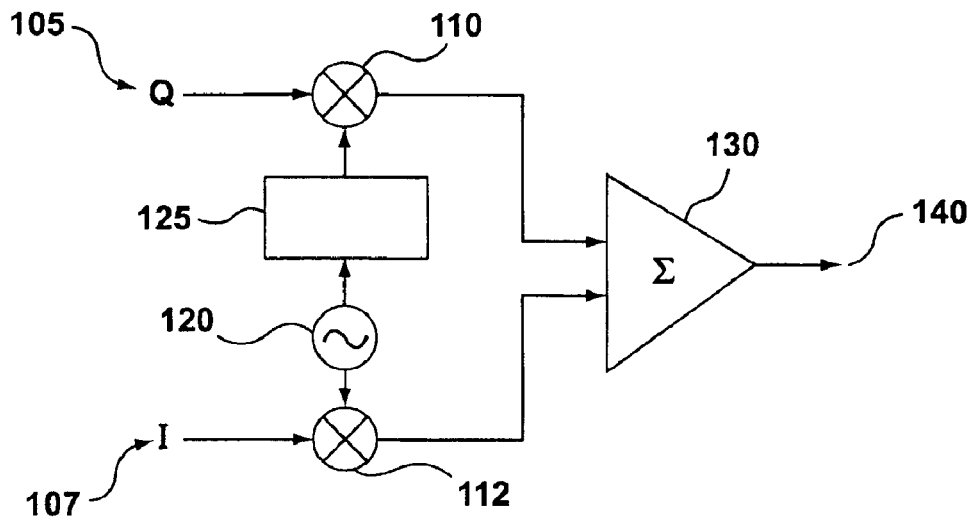
FIG. 1 is a schematic view of a prior art QPSK combining circuit.

In communication systems, quaternary phase shift keying (QPSK) techniques have been used to encode two independent bits of information onto a single output signal. FIG. 1 outlines a typical known QPSK combining circuit. The in-phase (I) information 107 acts as an input to a balanced modulator 112 which also receives a carrier from a local oscillator 120. The output of the balanced modulator 112 is connected as an input to a linear summer 130. The quadrature-phase (Q) information 105 acts as an input to a separate balanced modulator 110 which receives a 90 degree phase shifted carrier 125. The output from the balanced modulator 110 is connected as a second input to the linear summer 130. This process permits the two signals to be orthogonal, (i.e. in quadrature) with each other. Signals that are in quadrature do not interfere with each other, as they are two independent components of the composite signal 140. The main advantage of I/Q modulation is the combining of the two signals and then later at the interrogation transceiver the splitting of the composite signal into its original two independent components.

Figure 2:
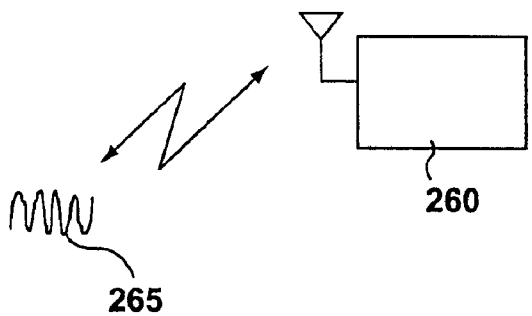
FIG. 2 is a similar view of a prior art SAW sensor.
Figure 2:
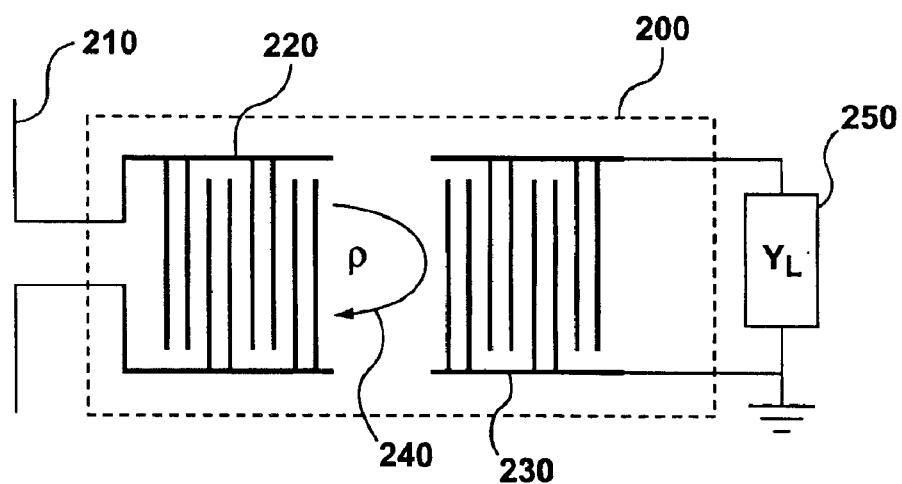

Information from a measuring transducer can be wirelessly sent back to an interrogation transceiver by means of a known SAW sensor shown in FIG. 2. A SAW IDT structure is lithographically deposited on a suitable substrate 200. The antenna 210 attached to an input/output IDT 220 receives an RF pulse 265 sent from an interrogation transceiver 260. The RF pulse 265 is transformed by the input/output IDT 220 to an acoustic wave which propagates toward the adjacent reflective IDT 230. This second IDT is then configured such that the measuring transducer acts as a load admittance 250 to the IDT. The external transducer's admittance 250 will change with respect to what particular parameter (temperature, pressure, etc.) being measured. A change in admittance will affect the acoustic reflection 240 characteristics (p) of the IDT 230.

SAW IDT structures in their simplest form have alternating fingers attached to either a "+ve" bus bar or a "−ve" bus bar. The fingers are normally a quarter acoustic wavelength in width at the IDT design frequency with an equal space between each alternate finger. More complex IDTs which result in improved signal characteristics use split-finger geometry. Each finger width and adjacent space is approximately an eighth-wavelength in width. The P-matrix notation for the reflection of a split finger transducer, which is terminated by a load admittance $Y_L$ is, $$P_{11}(Y_L) = P_{11,sc} + \frac{2P_{13}^2}{P_{33} + Y_L} \quad (1)$$

For a split finger transducer which is connected to a load $Y_L$, when $Y_L=0$ (open circuit) then IDT achieves maximum reflection and when $Y_L=\infty$ (short circuit) then a minimum reflection occurs within the IDT.

Figure 3:
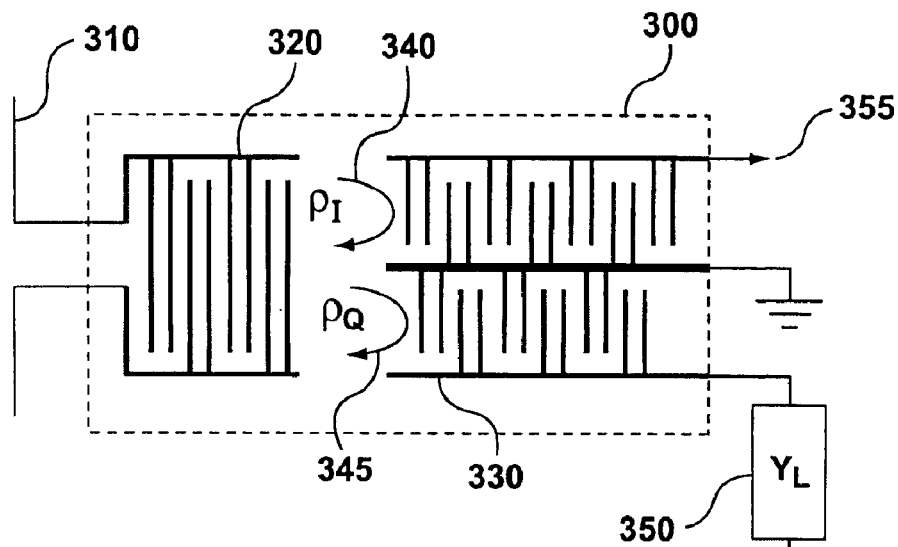
FIG. 3 is a similar view of a SAW RFID tag in accordance with one embodiment of the invention.

The I/Q technique shown previously in FIG. 1 can be applied to a dual track SAW sensor in accordance with one embodiment of the invention as illustrated in FIG. 3. A SAW IDT structure is lithographically constructed on to a suitable substrate 300. The antenna 310 which is attached to the input/output IDT 320 receives an RF pulse 265 from the interrogation transceiver 260. The RF pulse 265 is transformed by the input/output IDT 320 to an acoustic wave which propagates toward a dual track reflective IDT 330. The lower track functions in a similar fashion to the SAW sensor device of FIG. 2 in that the measuring transducer acts as a load admittance $Y_L$ 350 to the IDT. The external transducer's admittance will change with respect to which particular parameter (temperature, pressure, etc.) being measured. A change in admittance will affect the acoustic wave reflection 345 characteristics (pQ) of the lower track reflective IDT. The upper track also functions in a similar manner to the SAW sensor device of FIG. 2 in that a reference or second load admittance 355 will affect the acoustic wave reflection 340 characteristics (pI) of the upper track reflective IDT. The composite signal reflected back to the input/output IDT would then be, $$P_{11comp}(Y_L, Y_{ref}) = PQ_{11,sc} + \frac{2PQ_{13}^2}{PQ_{33} + Y_L} + PI_{11,sc} + \frac{2PI_{13}^2}{PI_{33} + Y_{ref}} \quad (2)$$

where the I channel (upper track is terminated in a load admittance $Y_{ref}$ and the Q channel (lower track) is terminated with a load admittance $Y_L$.

The two orthogonal acoustic wave reflections 340 and 345 recombine at the input/output IDT 320 to form a composite signal. A conversion from acoustic energy to RF energy takes place in the input/output IDT 320 to radiate out through the antenna 310 in the form of a modified RF pulse back to the interrogation transceiver 260.

Figure 4:
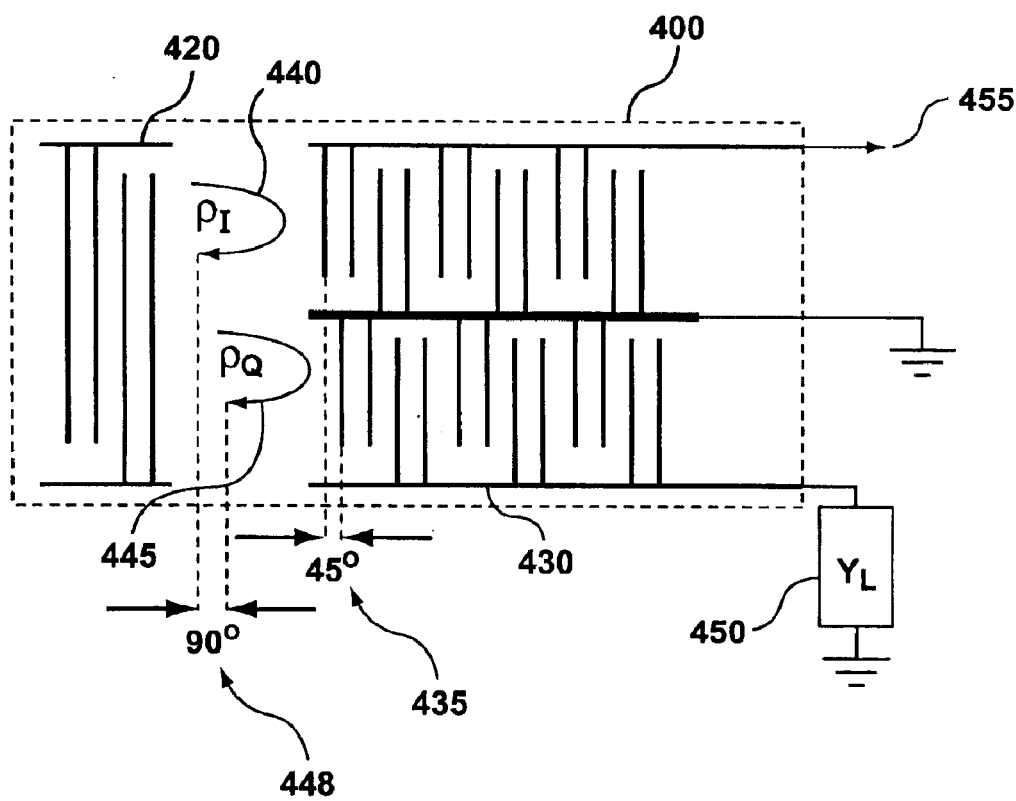
FIG. 4 is similar to FIG. 3 but additionally depicts the 45° offset within the split finger placement of the adjacent in-phase (I) and quadrature-phase (Q) tracks.

FIG. 4 shows in more detail the 45° offset 435 within the split finger placement of the adjacent I and Q tracks which produces the overall 90° difference 448 between the two signals, placing them in phase quadrature with respect to each other.

Figure 5:
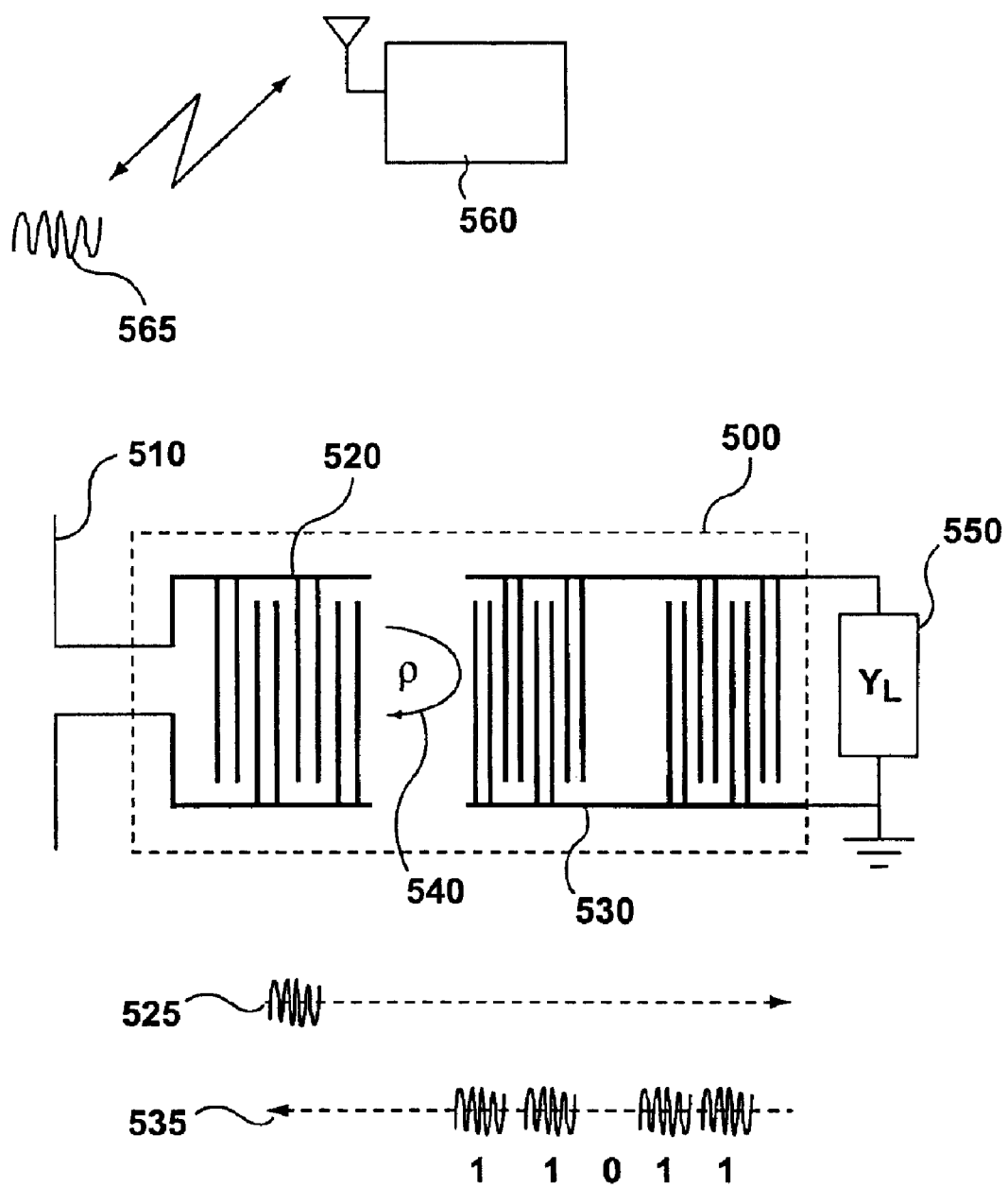
FIG. 5 is a similar view of a prior art SAW tag.

A prior art single track SAW RFID tag is illustrated in FIG. 5. A SAW IDT structure is again lithographically constructed on a suitable substrate 500. The antenna 510 which is attached to the input/output IDT 520 receives an RF pulse 265 sent from an interrogation transceiver 560. The RF pulse 265 is transformed by the input/output IDT 520 to an acoustic wave which propagates toward a coded reflecting IDT 530. Since the load $Y_L=0$ (550) there will be a maximum reflection from equation (1). The reflected acoustic wave 540 returning from the coded reflecting IDT 530 will have the code associated with it. For this example, the binary code could be 11011.

Figure 6:
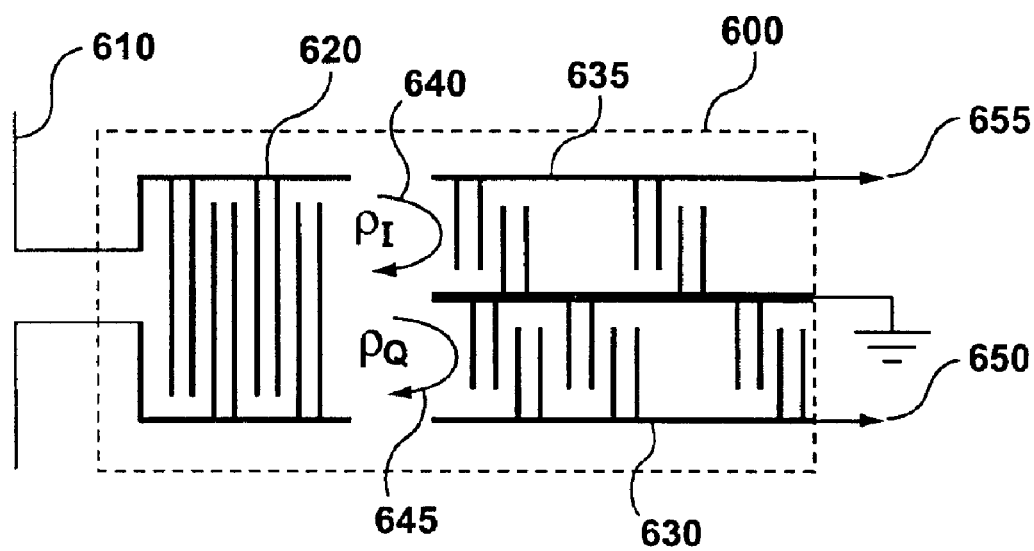
FIG. 6 is a similar view of a SAW (RFID) tag in accordance with the invention.
Figure 6:
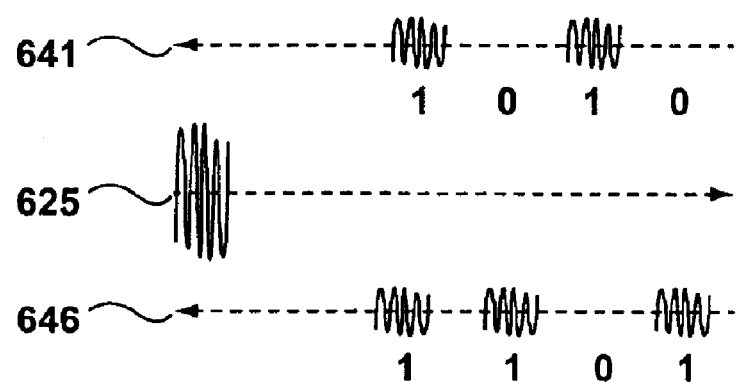

A dual track SAW RFID tag in accordance with another embodiment of the invention is illustrated in FIG. 6. A SAW IDT structure is again lithographically constructed on a suitable substrate 600. The antenna 610 which is attached to the input/output IDT 620 receives an RF pulse 265 sent from the interrogation transceiver 260. This RF pulse 265 is transformed by the input/output IDT 620 to an acoustic wave which propagates toward a dual tack coded reflective IDT 630 and 635. Since the load $Y_L=0$ (650) for the lower track reflective IDT 630 there will be a maximum reflection from equation (1). Similarly, the load $Y_L=0$ (655) for the upper track reflective IDT 635 and there will also be a maximum reflection from equation (1). The reflected acoustic waves 640 and 645 returning from their coded reflecting IDTs 635 and 630 respectively will each have unique codes independently associated with them. For this example the in-phase code of the upper track 635 may be 1010 and the quadrature-phase code of the lower track 630 may be 1101.

Figure 7:
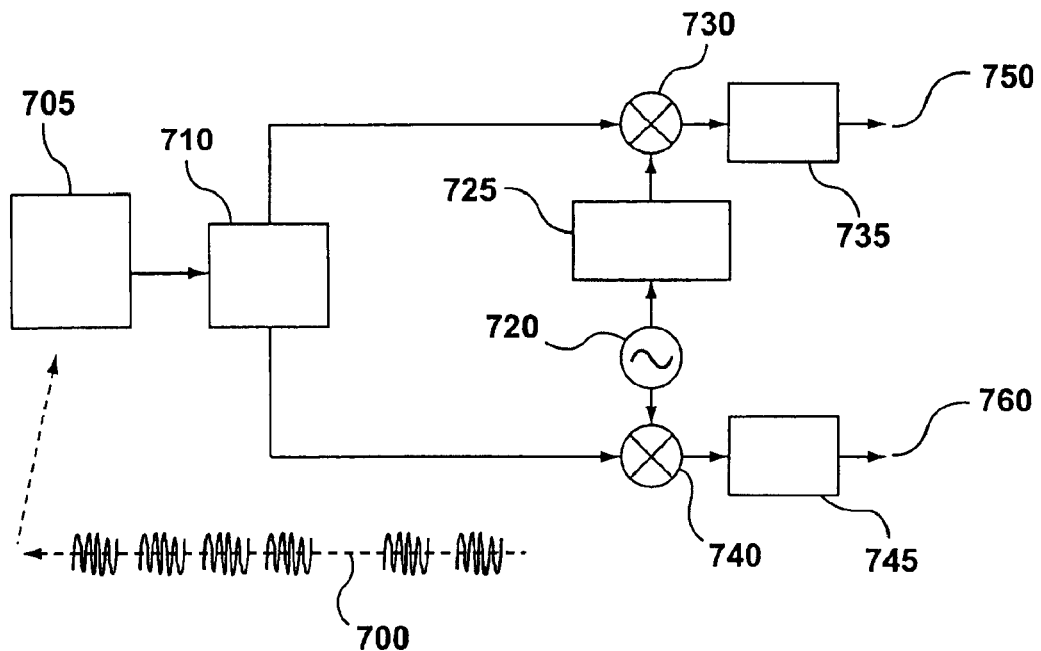
FIG. 7 is a similar view showing how a signal from a SAW device in accordance with the invention can be demodulated at the sensor.

The interrogation transceiver may consist, in part, of a quadrature demodulator illustrated in FIG. 7. An orthogonal complex signal returning 700 from the interrogated SAW device, being either an RFID tag or sensor, would enter the receiver's front end 705 where, once arrived, it would be suitably filtered and amplified. From the front-end, it would be split 710 and equal portions of the signal would proceed to the two balanced modulators 730 and 740. For the lower branch of FIG. 7, a carrier recovery source 720 is multiplied with the split orthogonal complex signal within the balanced modulator 740. This signal is then filtered 745 to produce demodulated in-phase (1) information 760. Similarly, for the upper branch of FIG. 7, a carrier recovery source 720 is passed through a 90° phase shifter 725 and then multiplied with the other split orthogonal complex signal within the balanced modulator 730. This signal is then filtered 735 to produce demodulated quadrature-phase (Q) information 750.

Figure 8:
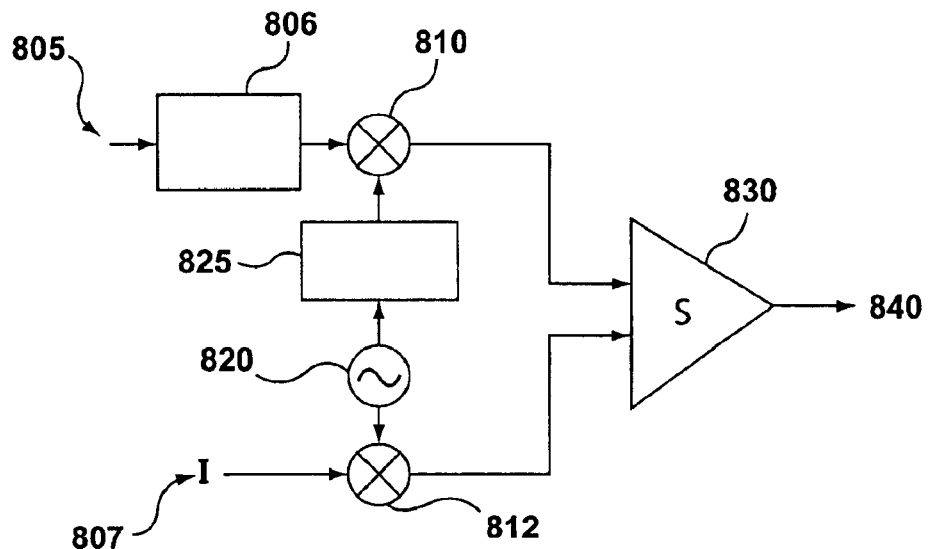
FIG. 8 is a similar view showing how an offset in time can be created between the I and Q information streams.

Another aspect of this invention is the ability to create an offset in time between the I and Q information streams. Offset QPSK (OQPSK) is a modified version of QPSK shown previously in FIG. 1, where the I and Q bits are offset or shifted in phase by one-half of a bit. FIG. 8 illustrates where half-bit delay 807 is placed in one of the data arms. All other components (with the exception of the delay) are identical with those of FIG. 1.

Figure 9:
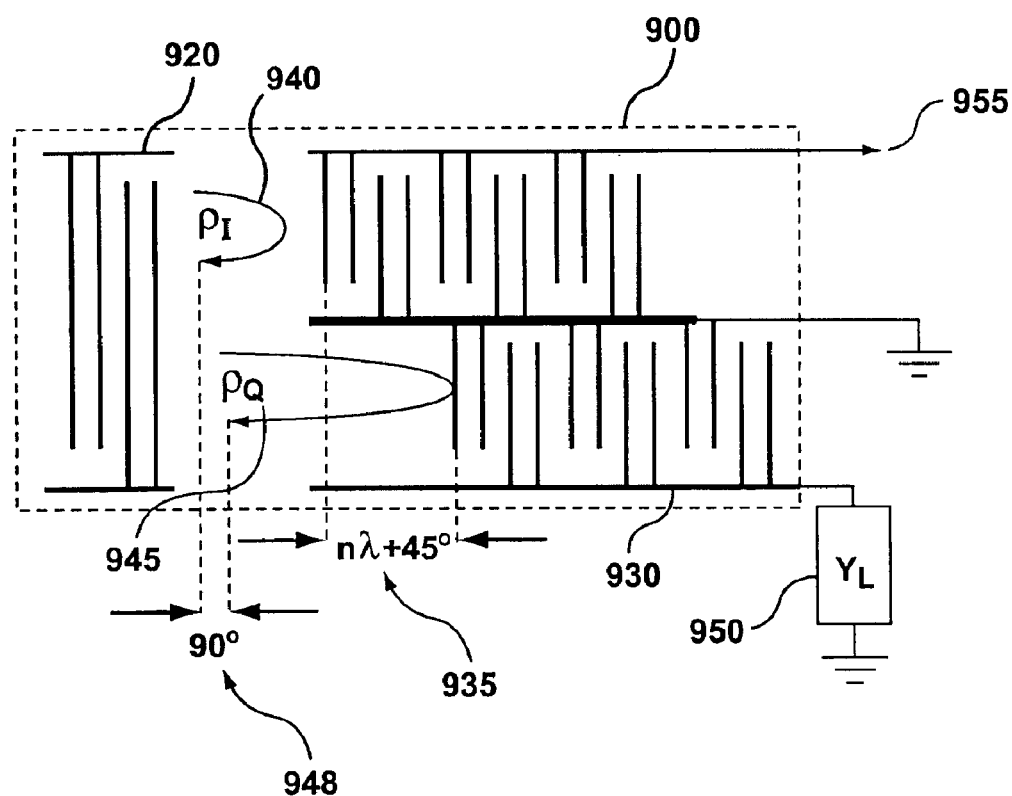
FIG. 9 shows how the principle shown in FIG. 8 can be incorporated in a SAW device in accordance with the invention.

A similar technique can then be applied to a SAW RFID tag or SAW sensor employing a dual track second IDT in accordance with the invention. FIG. 9 schematically outlines how this "half-bit" offset can be implemented into the SAW structure. Note the similarity between the offset IDT of FIG. 9 and previous FIG. 4 where there is a 45° offset in finger placement between adjacent tracks of the second IDT 435 to achieve an overall reflective displacement of 90° between the two tracks 448. The offset of FIG. 9 935 incorporates both the 45° finger offset along with a nλ offset to effect an offset ranging from 0 when n=0 to a half bit when n=one-half of the equivalent integer acoustic wavelengths which constitute the length of the interrogation pulse of one bit duration. This offset would be beneficial to avoid phase ambiguity problems, as a predetermined protocol would place the I information ahead of the offset Q information for more precise detection schemes.

Other embodiments and advantages of the invention will now be readily apparent to a person skilled in the art from the foregoing description, a scope of the invention being defined in the appended claims.

What is claimed is:

1. A SAW RFID tag or sensor, having:

an antenna for receiving and propagating an RF signal;

an input/output interdigital transducers (IDT) electrically connected to the antenna; and a dual track reflective IDT having a first track and a second track located adjacent and acoustically coupled to the input/output IDT, whereby said RF signal received from the antenna by the input/output IDT is transformed by the input/output IDT into an acoustic wave which is propagated to the dual track IDT; and one track of the dual track IDT being in-phase with the phase reference of the input/output IDT and the other track being in quadrature phase with said phase reference, whereby the input/output IDI receives two orthogonal complex modulated acoustic waves reflected from the first and second tracks and transforms them to a modulated orthogonal complex RF signal which is propagated from the antenna.

2. A tag or sensor according to claim 1 wherein one of the tracks is positioned to produce a half-bit effect time delay of the data therefrom.

3. A tag or sensor according to claim 1 wherein each track has an individual modulated identification code embedded within the geometries thereof.

4. A tag or sensor according to claim 1 wherein the in-phase track has an individual modulated identification code rooted into the reflected acoustic wave propagated to the input/output IDT.

5. A tag or sensor according to claim 1 wherein the quadrature phase track has an individual modulated identification code rooted into the reflected acoustic wave propagated to the input/output IDT.

6. A tag or sensor according to claim 1 wherein the first and second tracks have separate load impedances connected thereto.

7. A tag or sensor according to claim 6 wherein variation of the load impedance varies the reflection coefficient of the IDT.

8. A sensor according to claim 1 wherein the tracks have separate sensors connected thereto.

9. A sensor according to claim 8 wherein the sensors measure two independent physical environments.

10. A sensor according to claim 8 wherein the sensors measure a single physical environment with one of the sensors being configured as a reference.

11. A sensor according to claim 8 wherein the sensors measure the differential output of a single physical environment.

* * * * *